United States Patent
Jeon

(10) Patent No.: US 8,553,774 B2
(45) Date of Patent: *Oct. 8, 2013

(54) METHOD FOR PREDICTING AN IMAGE

(75) Inventor: Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 1410 days.

This patent is subject to a terminal disclaimer.

(21) Appl. No.: 11/042,083

(22) Filed: Jan. 26, 2005

(65) Prior Publication Data

US 2005/0129127 A1    Jun. 16, 2005

Related U.S. Application Data

(62) Division of application No. 10/335,331, filed on Dec. 31, 2002.

(30) Foreign Application Priority Data

Apr. 9, 2002 (KR) ................................. 2002-19262
Nov. 21, 2002 (KR) ................................. 2002-72862

(51) Int. Cl.
H04N 7/12 (2006.01)
H04N 11/02 (2006.01)
H04N 11/04 (2006.01)

(52) U.S. Cl.
USPC .................................................. 375/240.15

(58) Field of Classification Search
USPC ........................... 375/240.15, 240.24, 240.16
See application file for complete search history.

(56) References Cited

U.S. PATENT DOCUMENTS

| 5,838,872 A | 11/1998 | Kawara |
| 5,991,447 A * | 11/1999 | Eifrig et al. .................... 382/236 |
| 6,658,056 B1 | 12/2003 | Duruöz et al. |
| 6,816,552 B2 * | 11/2004 | Demos .................... 375/240.15 |

FOREIGN PATENT DOCUMENTS

| CN | 1526204 | 9/2004 |
| EP | 0 863 674 A2 | 2/1998 |
| EP | 0 863 674 A3 | 2/1998 |
| JP | 02-192378 | 7/1990 |
| JP | 2-192378 | 7/1990 |
| JP | 02-285816 | 11/1990 |
| JP | 2-285816 | 11/1990 |
| JP | 9-163376 | 6/1997 |
| JP | 2004-088722 | 3/2004 |
| JP | 2006-501761 | 1/2006 |
| WO | WO 01/33864 A1 | 5/2001 |
| WO | WO 2004/032506 | 4/2004 |

OTHER PUBLICATIONS

ITU—Telecomminications Sector, Video Coding Experts Group, Improved Direct mode for B pictures in TML, Aug. 8, 2000, Study Group 16, Question 15, pp. 1-2.*

(Continued)

Primary Examiner — Mehrdad Dastouri
Assistant Examiner — Jeremaiah C Hallenback-Huber
(74) Attorney, Agent, or Firm — Harness, Dickey & Pierce, P.L.C.

(57) ABSTRACT

In the method for predicting an image, a reference image block for a current image block of a moving picture is obtained using motion vector information, and a variable weight factor is applied to the reference image block to form a product value of the weight factor and the reference image block. The current image block of the moving picture is predicted using the product value.

1 Claim, 2 Drawing Sheets

(56) References Cited

OTHER PUBLICATIONS

Tsuhan Chen et al., "A New Frame Interpolation Scheme for Talking Head Sequences", Proceedings of the International Conference on Image Processing (ICIP), Washington, Oct. 23-26, 1995, Los Alamitos, IEEE Comp. Soc. Press, US, vol. 3, 23 Oct. 1995, pp. 591-594.
"Working Draft No. 2, Revision 2 (WD-2)" Document JVT-B118R2, Jan. 29, 2002, pp. 1-10.
Search Report issued Jan. 31, 2008 by the European Patent Office in counterpart EP Patent Application No. 07019719.9-2223.
Document Q15-K-44, ITU—Telecommunications Standardization Sector, Study Group 16, Video Coding Experts Group (Question 15), Eleventh Meeting, Portland, Oregon, USA, Aug. 22-25, 2000.
Document JVT-B057, Joint Video Team (JVT) of ISO/TEC MPEG & ITU-T VCEG, $2^{nd}$ Meeting: Geneva, CH, Jan. 29-Feb. 1, 2002.
Office Action by Japanese Patent Office, mailed Jul. 6, 2010, for Appl. No. 2006-000627.
Office Action by German Patent Office mailed Jun. 15, 2010, for Appl. No. 103 62 305.1-55.
Office Action by Japanese Patent Office, mailed Apr. 20, 2010, for Appl. No. 2008-053845.
Office Action by Japanese Patent Office, mailed Apr. 20, 2010, for Appl. No. 2008-053934.
Office Action by Japanese Patent Office, mailed Apr. 20, 2010, for Appl. No. 2008-053982.
Office Action by Japanese Patent Office, mailed Apr. 20, 2010, for Appl. No. 2008-053850.
Wiegand, T. "Working Draft No. 2, Revision 2 (WD-2)" (JVT) of ISO/IEC MPEG and ITU-T VCEG, Document JVT-B118r2, Mar. 15, 2002, pp. 1, 60, 64-68.
Japanese Office Action dated Sep. 28, 2010, mailed Oct. 5, 2010, issued in Application No. JP 2008-053958.
Kondo, Satoshi et al. "Proposal of Minor Changes to Multi-Frame Buffering Syntax for Improving Coding Efficiency of B-pictures." Joint Video Team (JVT) of IS/IEC MPEG & ITU-T VCEG (ISO/IEC JTC1/SC29/WG11 and ITU-T SG16 Q.6); $2^{nd}$ Meeting: Geneva, CH, Jan. 29-Feb. 1, 2002.
Kondo, Satoshi et al. "New Prediction Method to..Improve B-picture Coding Efficiency." IU—Telecommunications Standardization Sector; Study Group 16 Question 6, Video Coding Experts Group (VCEG). $15^{th}$ Meeting, Pattaya: Thailand, Dec. 4-6, 2001.
Japanese Office Action dated Jul. 5, 2005.
U.S. Office Action mailed Sep. 14, 2012 for U.S. Appl. No. 11/042,051.
Combined Search and Examination Report dated Apr. 1, 2005.
Japanese Office Action dated Jul. 28, 2011.
Lillevold, K. "Improved Direct Mode for B Pictures in TML" Aug. 22, 2000, ITU-Telecommunications Standardization Sector Study Group 16, Video Coding Experts Group, Eleventh Meeting, document Q15-K-44, 3 pages.
MPEG-4, Sep. 30, 1998, 6 pages.
Sullivan, G. "Announcement of the Eleventh Meeting of Experts Group for ITU-T Q15/SG16—Advanced Video Coding, Portland, Oregon, Aug. 22-25, 2000", 12 pages.
List of Meeting Attendees for the ITU Work on Advance Video Coding, Q15/16, 3 pages, Aug. 25, 2000.
Eleventh Meeting of ITU-T Q.15/SG16 Advanced Video Coding Experts Group, Aug. 21-14, 2000, Meeting Plan, 5 pages.
List of Documents for the Eleventh Meeting ITIU-T Q.15/SG16 Video Coding Experts Group, 6 pages, Aug. 18, 2000.
Transfer of ftp://standards.pictel.com to ITU, 3 pages, Apr. 4, 2013.

\* cited by examiner

METHOD FOR PREDICTING AN IMAGE

DOMESTIC PRIORITY INFORMATION

This is a divisional of U.S. application Ser. No. 10/335,331 filed Dec. 31, 2002; the contents of which are hereby incorporated by reference in their entirety.

FOREIGN PRIORITY INFORMATION

The present invention claims priority under 35 U.S.C. 119 on Korean Application No. 10-2002-0019262 filed Apr. 9, 2002 and Korean Application No. 10-2002-0072862 filed Nov. 21, 2002; the contents of which are hereby incorporated by reference in their entirety.

BACKGROUND OF THE INVENTION

1. Field of the Invention

The present invention relates to a moving picture coding system.

2. Description of the Background Art

A moving picture coding system is able to have higher coding efficiency with a B picture (a predicted image that may be based on the motion vectors) than the coding efficiency when using only P pictures (a predicted image based on one motion vector).

For the B picture, the block prediction method for a direct mode involves calculating a forward motion vector and a backward motion vector as scaled versions of a motion vector of a co-located block in a backward reference picture for direct mode, to then obtain two distinct motion-compensated blocks using the forward and backward motion vectors, respectively. A predicted block is then obtained by averaging the two motion-compensated blocks.

The block prediction method for the direct mode as described above will be described in more detail with reference to FIG. 1.

FIG. 1 is a view showing a picture pattern for describing the block prediction method for the direct mode according to the conventional art. The picture pattern comprises an I-picture (not shown) coded using prediction only from decoded samples within the same picture (e.g., intra prediction), P pictures P1, P4, and P7 coded by inter prediction using at most one motion vector from previously-decoded reference pictures, and B-pictures B2, B3, B5 and B6 coded by two inter prediction blocks from previously-decoded reference pictures.

Also, parameters shown in FIG. 1 will first be described first for the sake of convenience. $TR_D$ represents a temporal distance between a forward reference picture for direct mode (P1) and a backward reference picture for direct mode (P7), $TR_B$ represents a temporal distance between the forward reference picture for direct mode (P1) and a current B picture (B5), MV represents a motion vector of a co-located block in the backward reference picture for direct mode (P7), $MV_f$ represents a forward motion vector of direct mode pointing to the forward reference picture for direct mode, and $MV_b$ represents a backward motion vector of direct mode pointing to the backward reference picture for direct mode. Herein, the forward reference picture for direct mode is a reference picture pointed by the motion vector of the co-located block in the backward reference picture for direct mode.

The block prediction method for direct mode will be described using the above parameters as follows.

First, the forward motion vector of direct mode ($MV_f$) is obtained from a motion vector (MV) of a co-located block $B_S$ in the backward reference picture for direct mode (P7) by applying following equation (1).

$$MV_f = \frac{TR_B \times MV}{TR_D} \quad (1)$$

In addition, the backward motion vector of direct mode ($MV_b$) is obtained from a motion vector (MV) of the co-located block $B_S$ in the backward reference picture for direct mode (P7) by applying following equation (2).

$$MV_b = (TR_B - TR_D) \times \frac{MV}{TR_D} \quad (2)$$

Therefore, blocks $B_f$ and $B_b$ are motion-compensated using the motion vectors $MV_f$ and $MV_b$ calculated from equations (1) and (2), and after that, the two blocks are averaged to get a prediction value $B_c'$ of a current block $B_c$ in the B picture as following equation (3).

$$B_c' = \frac{B_f + B_b}{2} \quad (3)$$

However, according to the block prediction method for the direct mode of the conventional art, the forward motion vector of direct mode is obtained from the motion vector of the co-located block in the backward reference picture for direct mode, and therefore, the obtained value is just an approximated value, not a precise motion vector of the current block of the B picture.

Also, according to the block prediction method for direct mode of the conventional art, even though the reference picture temporally close to the B picture has higher similarity with the B picture, the block prediction is made using the average of two distinct motion-compensated blocks without considering temporal distance between the reference pictures. Therefore, the accuracy of predicted block is lowered.

Especially, in a sequence having a fading scene, since brightness of continuous B pictures can be gradually darkened or gradually lightened, the prediction value obtained by simply averaging two motion-compensated blocks can differ significantly from the original value, and thereby the coding efficiency of the entire system is greatly lowered.

SUMMARY OF THE INVENTION

The present invention provides a method for predicting an image.

In one embodiment, a reference image block for a current image block of a moving picture is obtained using motion vector information, and a variable weight factor is applied to the reference image block to form a product value of the weight factor and the reference image block. The current image block of the moving picture is predicted using the product value.

In one embodiment, the moving picture and a reference picture pertaining to the reference image block have display order information respectively, and the weight factor may be dependent on the display order information of the moving picture and the display order information of the reference picture. For example, the weight factor may increase as a difference between the display order information of the moving picture and the display order information of the reference picture decreases.

The display order information may include a picture order count, and the weight factor may increase as a difference between the picture order count of the moving picture and the picture order count of the reference picture decreases.

In another embodiment, the weight factor may be dependent on a temporal distance between the moving picture and a reference picture including the reference image block. For example, the weight factor may increase as the temporal distance between the moving picture and the reference picture decreases.

In another embodiment, the weight factor varies in accordance with a reference picture pertaining to the reference image block.

In a still further embodiment, the weight factor is obtained based on a reference picture pertaining to the reference image block.

Yet another embodiment includes obtaining a reference image block for the current image block using motion vector information, and applying a weight factor to the reference image block to form a product value of the weight factor and the reference image block. In this embodiment, the weight factor is not fixed to a particular value. The current image block of the moving picture is predicted using the product value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EXAMPLE EMBODIMENTS

Reference will now be made in detail to the example embodiments of the present invention, examples of which are illustrated in the accompanying drawings.

In a block prediction method, for example in a direct mode, according to the present invention, a forward motion vector and a backward motion vector of a direct mode may be calculated from a motion vector of a co-located block in a backward reference picture for direct mode. Then, two motion-compensated blocks are obtained using the above motion vectors, and a predicted block is obtained by interpolation using the two motion-compensated blocks.

Also, in the block prediction method according to the present invention, the backward motion vector may be calculated from the backward reference picture for direct mode, a forward motion vector of direct mode may be calculated from the reference picture closest to the current B picture among the forward reference pictures, motion-compensated blocks may be obtained from the above motion vectors, and a predicted block may be obtained by interpolation using the two motion-compensated blocks.

Hereinafter, embodiments of the present invention will be described with reference to accompanying Figures as follows.

Figure 2:
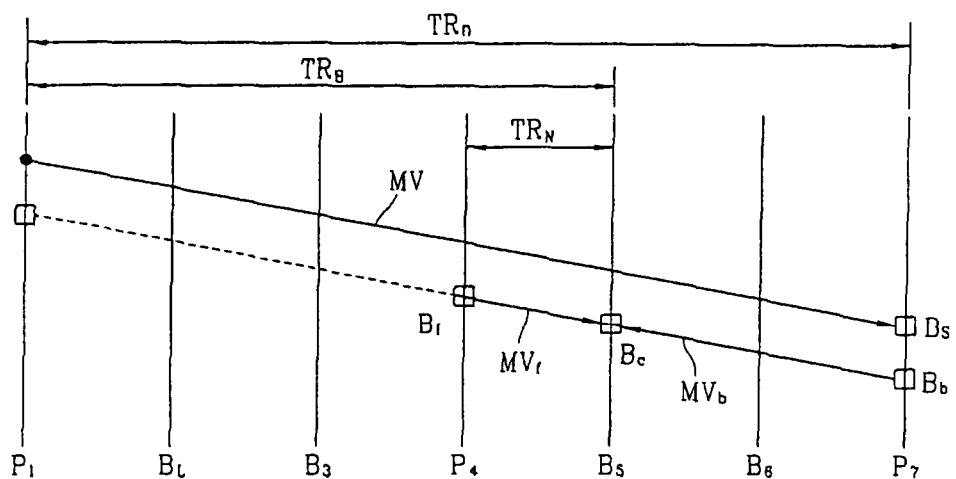
FIG. 2 is a view showing a picture pattern for describing a block prediction method according to the present invention.

FIG. 2 shows a picture pattern for describing the block prediction method for direct mode according to the present invention. The picture pattern comprises an I-picture (not shown) coded using prediction only from decoded samples within the same picture, P pictures P1, P4, and P7 coded by inter prediction using at most one motion vector from previously-decoded reference pictures, and B-pictures B2, B3, B5 and B6 coded by two inter prediction blocks from previously-decoded reference pictures.

Parameters shown in FIG. 2 will be described first for the sake of convenience. $TR_D$ represents a temporal distance between a forward reference picture for direct mode (P1) and a backward reference picture for direct mode (P7), $TR_B$ represents a temporal distance between the forward reference picture for direct mode (P1) and a current B picture (B5), $TR_N$ represents a temporal distance between the reference picture (P4) closest to the current B picture and the current B picture (B5), MV represents a motion vector of a co-located block in the backward reference picture for direct mode (P7), $MV'_f$ represents a forward motion vector of direct mode pointing to the reference picture (P4) closest to the current B picture, and $MV_B$ represents a backward motion vector of direct mode pointing to the backward reference picture for direct mode (P7).

The motion vector (MV) of the co-located block $B_S$ in the backward reference picture for direct mode (P7) is established in the process of coding (or decoding) the backward reference picture for direct mode before the current B picture is coded (or decoded).

The block prediction method for direct mode as constructed above according to the present invention will be described as follows.

The forward motion vector ($MV'_f$), which points to the reference picture (P4) having the closest temporal distance among the forward reference pictures, is obtained from following equation (4).

$$MV'_f = \frac{TR_N \times MV}{TR_D} \quad (4)$$

In addition, the backward motion vector ($MV_b$), which points to the backward reference picture for direct mode (P7), is obtained according to the conventional art using equation (2) reproduced below.

$$MV_b = (TR_B - TR_D) \times \frac{MV}{TR_D} \quad (2)$$

Accordingly, motion-compensated blocks $B_f$ and $B_b$ are obtained using the motion vectors $MV'_f$ and $MV_b$ calculated in the convention manner, but using the motion vectors from equations (2) and (4).

Figure 1:
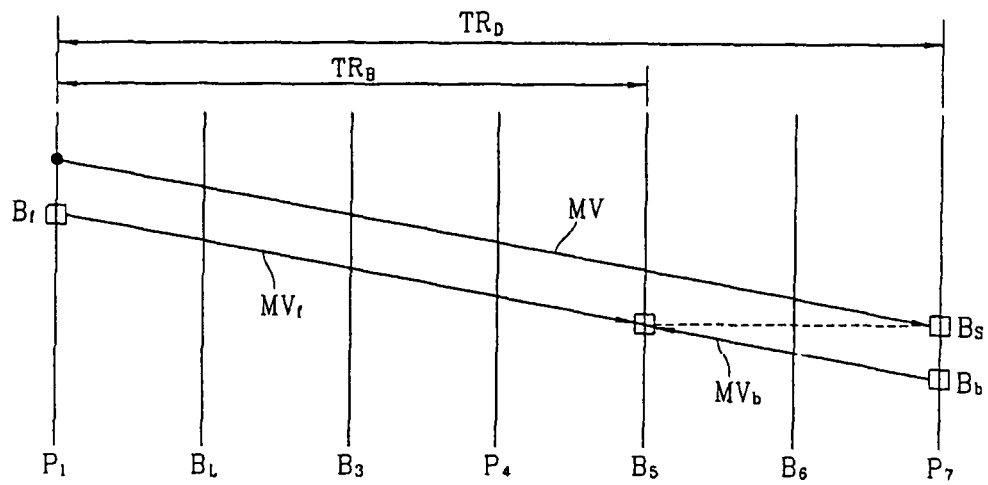
FIG. 1 is a view showing a picture pattern for describing a block prediction method for direct mode according to the conventional art.

However, the block prediction method according to the present invention may be applied to the example situations in either FIG. 1 or FIG. 2. Therefore, the reference picture in which the motion-compensated block $B_f$ exists may be the forward reference picture for direct mode (for example, P1 picture in FIG. 1) or the reference picture closest to the B picture (for example, P4 picture in FIG. 2). It will be appreciated that these are only two example situations, and that the present invention is not limited to these two examples.

The block prediction method according to the present invention performs interpolative prediction considering the temporal distance between the current B picture and the reference picture in which the motion-compensated block $B_f$ exists (that is, the forward reference picture for direct mode or the reference picture closest to the B picture in the two example situations of FIGS. 1 and 2), and considering the temporal distance between the current B picture and the backward reference picture for direct mode.

Figure 3:
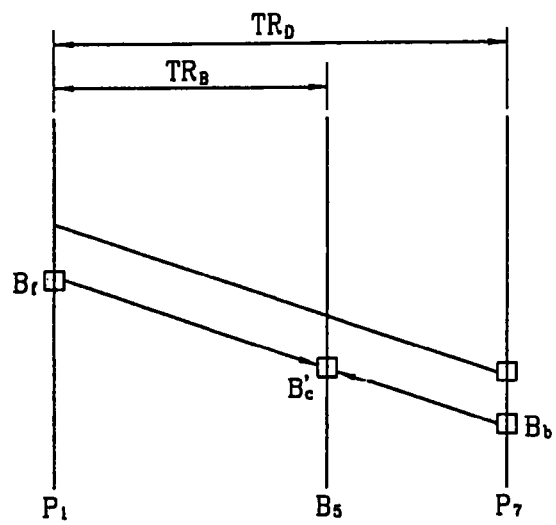
FIG. 3 is a view showing a picture pattern for describing an interpolative prediction method according to an embodiment of the present invention.

As shown in FIG. 3, if the forward motion vector of direct mode is obtained using the conventional art, the motion-compensated block $B_f$ exists in the forward reference picture for direct mode (P1) and the motion-compensated block $B_b$ exists in the backward reference picture for direct mode (P7). The interpolative prediction is performed according to equation (5) below. Herein, $TR_D$ is the temporal distance between the forward reference picture for direct mode (P1) and the backward reference picture for direct mode (P7), and $TR_B$ is the temporal distance between the forward reference picture for direct mode (P1) and the current B picture (B5). As shown in Equation (5), the interpolative predictive method involves taking a weighted average of the two motion-compensated blocks $B_f$ and $B_b$. The weighting of the motion-compensated block $B_f$ is based on the temporal difference between the current picture (B5) and the reference picture (P7), which is related to the motion-compensated block $B_b$. The weighting of the motion-compensated block $B_b$ is based on the temporal difference between the current picture (B5) and the reference picture (P1), which is related to the motion-compensated block $B_f$. Also, as will be appreciated from equation (5), each weight may be expressed as a function of the other weight.

$$B'_c = B_f \times \frac{(TR_D - TR_B)}{TR_D} + B_b \times \frac{TR_B}{TR_D} \quad (5)$$

Figure 4:
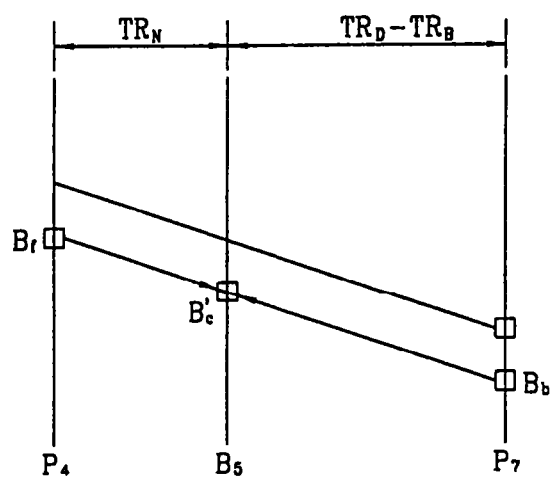
FIG. 4 is a view showing a picture pattern for describing an interpolative prediction method according to another embodiment of the present invention.

Also, FIG. 4 shows the case that the forward motion vector of direct mode is obtained according to the embodiment of the present invention where the motion-compensated block $B_f$ exists in the reference picture (P4) closest to the current B picture and the motion-compensated block $B_b$ exists in the backward reference picture for direct mode (P7). Therefore, the interpolative prediction is performed as shown in equation (6) below. Herein, $TR_D$ is the temporal distance between the forward reference picture for direct mode (P1) and the backward reference picture for direct mode (P7), and $TR_B$ is the temporal distance between the forward reference picture for direct mode (P1) and the current B picture, and $TR_N$ is the temporal distance between the reference picture (P4) closest to the current B picture and the current B picture.

$$B'_c = B_f \times \frac{(TR_D - TR_B)}{(TR_N + TR_D - TR_B)} + B_b \times \frac{TR_N}{(TR_N + TR_D - TR_B)} \quad (6)$$

Again, as shown in equation (6), the interpolative predictive method involves taking a weighted average of the two motion-compensated blocks $B_f$ and $B_b$. The weighting of the motion-compensated block $B_f$ is based on the temporal difference between the current picture (B5) and the reference picture (P7), which is related to the motion-compensated block $B_b$. The weighting of the motion-compensated block $B_b$ is based on the temporal difference between the current picture (B5) and the reference picture (P4), which is related to the motion-compensated block $B_f$. Also, as will be appreciated from equation (6), each weight may be expressed as a function of the other weight.

The respective pictures may also be represented or referenced using display order information such as a picture order count. Here equations (5) and (6) may be represented as equation (7) below using the picture order count values, which are display order information of the respective pictures. Herein, $T_c$ is a picture order count value, that is, the display order information allocated to the current B picture; $T_f$ is a picture order count value, that is, the display order information allocated to the forward reference picture for direct mode or a picture order count value, that is, the display order information allocated to the reference picture closest to the B picture in case that the forward motion vector is calculated by the equation (4); and $T_b$ is a picture order count value, that is, the display order information allocated to the backward reference picture for direct mode.

$$B'_C = B_f \times \frac{(T_b - T_c)}{(T_b - T_f)} + B_b \times \frac{(T_c - T_f)}{(T_b - T_f)} \quad (7)$$

In this example, equation (7) shows that the interpolative prediction method involves taking a weighted average of the two motion-compensated blocks $B_f$ and $B_b$. Here, the weighting of the motion-compensated block $B_f$ is based on the picture order count difference between the picture order count of the current block (B5) and the picture order count of the reference picture (P7) related to the motion-compensated block $B_b$; and the weighting of the motion-compensated block $B_b$ is based on the picture count difference between the picture order count of the current block (B5) and the picture order count of the reference picture (P1) or (P4) related to the motion compensated block $B_f$. Also, as will be appreciated from equation (7), each weight may be expressed as a function of the other weight.

As described above, according to the present invention, the forward motion vector for direct mode is obtained from the motion vector of the co-located block in the backward reference picture for direct mode, and a predicted block of the B picture, which is about to be coded, is obtained by applying interpolative prediction to the motion-compensated block values. Therefore, the coding efficiency is improved.

Also, according to the present invention, the forward motion vector of direct mode may be obtained from the reference picture closest to the B picture which is about to be coded (or decoded) presently and having higher similarity with the B picture. The predicted block of the B picture may then be obtained by applying the interpolative prediction to the blocks which are motion-compensated from the above forward motion vector and backward motion vector. Therefore, the accuracy of the predicted block can be improved and the coding efficiency can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope, and therefore all changes and modifications, or equivalence are therefore intended to be embraced by the invention.

What is claimed is:

1. A method for a decoding device to predict a bi-predictive block of a current picture, the method comprising:

deriving, by the decoding device, a first picture order count allocated to a first picture, wherein the first picture is a reference picture of the current picture;

deriving, by the decoding device, a second picture order count allocated to the current picture;

deriving, by the decoding device, a third picture order count allocated to a second picture;

deriving, by the decoding device, a fourth picture order count allocated to a third picture, wherein the second picture is a reference picture of the third picture;

scaling, by the decoding device, a motion vector of a block in the third picture based on the first, second, third and fourth picture order counts to calculate a first motion vector for the bi-predictive block;

determining, by the decoding device, a first motion-compensated block in the first picture by using the first motion vector;

determining, by the decoding device, a second motion-compensated block;

obtaining, by the decoding device, first and second variable weight factors for the first and second motion-compensated blocks; and predicting, by the decoding device, the bi-predictive block based on a sum of a first value and a second value, wherein the first value is a multiplication value of the first weight factor and the first motion-compensated block, the second value is a multiplication value of the second weight factor and the second motion-compensated block, wherein the first picture order count, the second picture order count, the third picture order count, and the fourth picture order count are values counted in display order.

* * * * *